United States Patent

[11] 3,615,898

[72] Inventor Donald L. Coffman
 Tarentum, Pa.
[21] Appl. No. 750,484
[22] Filed Aug. 6, 1968
[45] Patented Oct. 26, 1971
[73] Assignee Allegheny Ludlum Steel Corporation
 Brackenridge, Pa.

[54] TORCH CUTTING OF HIGH-TEMPERATURE ALLOYS
 1 Claim, No Drawings

[52] U.S. Cl. ................................................. 148/9
[51] Int. Cl. ................................................. B23k 7/08
[50] Field of Search ........................................ 148/9

[56] References Cited
UNITED STATES PATENTS
3,520,739 7/1970 Richards ..................... 148/9
3,508,323 4/1970 Richards ..................... 148/9

*Primary Examiner*—L. Dewayne Rutledge
*Assistant Examiner*—W. W. Stallard
*Attorneys*—Richard A. Speer, Vincent G. Gioia and James A. Bereburg

ABSTRACT: A method of facilitating the torch cutting of heat-resistant alloys whereby additional flame heat is provided by interposing a sheet of titanium between the torch and the alloy.

TORCH CUTTING OF HIGH-TEMPERATURE ALLOYS

This invention relates to torch cutting of heavy sections of high-temperature alloys and more particularly to a method of torch cutting heavy sections of high-nickel alloys.

In the processing of high-temperature alloys and more particularly high-nickel alloys, it is often necessary to torch cut heavy sections. The normal method of cutting slabs of steel other than heat-resistant alloys of up to 50 inches in width and 14 inches in thickness is by means of a commercial torch utilizing iron powder, natural gas and oxygen to develop a flame having a temperature in the range of 4,800° F. However, such a torch is not suitable for efficiently cutting high-nickel alloy slabs since it does not develop sufficient temperature. The alternative is to utilize a much larger torch which develops higher temperatures or to use methods other than a torch to cut the slabs. The primary disadvantage of these approaches is that when larger torches are used, such torches are extremely expensive and further, due to the size of the torch required, the torch path is much wider and considerable nickel alloy is lost during cutting. If other methods are used, revisions of manufacturing procedures are required.

It is, therefore, an object of this invention to provide an inexpensive and simple method of cutting heavy sections of heat-resistant alloys and more particularly, high-nickel alloys.

In accordance with the invention a standard commercial torch, such as one which is capable of developing a temperature of approximately 4,800° F., can be utilized to efficiently cut heavy sections of heat-resistant alloys having elevated melting temperatures by interposing a piece of titanium sheet or plate, which may be scrap material, between the flame and the section to be cut. As the titanium, which may be commercially pure titanium or titanium alloy, melts the effective torch temperature is raised to at least about 5,400° F. and usually about 5,500° F. which is sufficient to rapidly cut through the heat-resistant alloy section.

The invention is practiced with advantage in those instances when it is necessary to cut heavy slabs of high-melting metals such as nickel alloys and steel. For ordinary steels the common practice is to utilize a cutting torch which is generally semiautomatic to cut sections from the slab. However, such torches have proved inadequate when the steel slab is a high-melting point alloy and particularly a high-nickel alloy steel since the torch does not develop sufficient heat to efficiently cut through slabs of such alloys. As a result, when conventional torches are used for such an application, extended periods of time are required to cut through the slab. Further, if heavier duty torches are utilized to reduce the time required to accomplish the desired result or alternate methods of cutting are utilized, the process becomes extremely expensive due to the cost of the heavy-duty torches and the loss of the alloy during the cut resulting from the wide cutting path of such heavy-duty torches, or due to implementation of new procedures.

It has now been discovered that it is possible to increase the effective flame temperature of the conventional cutting torch so as to permit its use in cutting heavy slabs of heat-resistant alloys and particularly high-nickel alloys in an efficient manner.

In one example of the practice of the invention, sections were cut from steel slabs 50 X inches wide × 14 inches thick having a nominal composition (percent by weight) as follows:

| C | Mn | S | Si | Ce | Fe | Cu | Co | Ni |
|---|---|---|---|---|---|---|---|---|
| .08 | 1.00 | .015 | .50 | 14–17 | 6–10 | .50 | .10 | 72 Min. |

A commercial torch using natural gas, oxygen and iron powder as the heat source, which developed a temperature of approximately 4,800° F. at the flame was available to make the cut. In the utilization of this torch to cut the slabs described it was extremely difficult to initiate a cut, and when initiated, required a period of approximately 4 hours to complete the cut. However, by interposing a piece of titanium flat-roll scrap between the flame and the alloy slab, the effective flame temperature of the torch was increased to approximately 5,500° F. and the cut was completed in a period of 2 hours.

Obviously, the invention is not limited to particular high-melting point alloys nor to the type of torch used in the example of the invention but rather is adaptable to any situation where it is necessary to increase the effective temperature of a cutting torch or the like.

Similarly, the use of titanium to bring about the effective increase in torch temperature is merely by way of example since other elements may be employed to bring about the desired result limited only in that the reaction be exothermic to increase the effective torch temperature.

Although a preferred embodiment has been described, it is to be understood that various adaptations and modifications may be resorted to without departing from the scope of the appended claims.

I claim:

1. In the method of cutting thick nickel-alloy articles such as slabs, plates and the like, wherein a flame torch capable of attaining a temperature of at least 4,800° F. is produced and directed against the metal to be cut, the improvement which comprises interposing between the flame and the nickel-alloy to be cut a layer of titanium whereby the flame torch temperature is raised to at least about 5,400° F.

* * * * *